(12) United States Patent
Gaston et al.

(10) Patent No.: US 6,675,836 B1
(45) Date of Patent: Jan. 13, 2004

(54) CLAMP FOR STOPPING GAS LEAKS

(75) Inventors: Michael Wade Gaston, Rowlett, TX (US); Lance Richard Andrews, Euless, TX (US)

(73) Assignee: Basic Resources, Inc., Dallas, TX (US)

( * ) Notice: Subject to any disclaimer, the term of this patent is extended or adjusted under 35 U.S.C. 154(b) by 0 days.

(21) Appl. No.: 10/255,357

(22) Filed: Sep. 26, 2002

(51) Int. Cl.$^7$ ............................................. F16L 55/168
(52) U.S. Cl. .......................... 138/99; 138/97; 285/15; 294/106
(58) Field of Search .............................. 138/99, 97, 98; 285/15; 294/103.1, 104, 106

(56) References Cited

U.S. PATENT DOCUMENTS

| | | |
|---|---|---|
| 847,594 A | 3/1907 | McCreary |
| 2,272,621 A | 2/1942 | Merrill .................... 113/102 |
| 2,325,417 A | 7/1943 | Merrill et al. ................ 81/39 |
| 3,117,904 A | 1/1964 | Black ....................... 156/475 |
| 3,502,112 A | 3/1970 | Hankila ...................... 138/99 |
| 4,172,472 A | 10/1979 | Parrish ....................... 138/97 |
| 4,535,822 A | 8/1985 | Rogers, Jr. ................... 138/99 |
| 5,012,842 A | 5/1991 | Savard ....................... 138/161 |
| 5,123,451 A | 6/1992 | Savard ........................ 138/99 |
| 5,297,584 A * | 3/1994 | Goad et al. ................... 138/99 |
| 5,365,977 A * | 11/1994 | Goad et al. ................... 138/99 |
| 5,437,489 A | 8/1995 | Sanders et al. ................ 294/88 |
| 5,577,535 A | 11/1996 | Motta et al. .................. 138/99 |
| 5,771,938 A | 6/1998 | McKenzie .................... 138/99 |
| 5,797,432 A | 8/1998 | Bennett et al. ................ 138/99 |

OTHER PUBLICATIONS

*The TDW Backstopp*, Jul. 1994, 5 pages, TDW Pub. 60160, T.W. Williamson, Inc., Tulsa, Oklahoma USA.
*Backstopp*, 2 pages, T.D. Williamson, Inc., Tulsa, Oklahoma USA.

* cited by examiner

*Primary Examiner*—Patrick Brinson
(74) *Attorney, Agent, or Firm*—Hunton & Williams LLP

(57) ABSTRACT

A clamp attachable to a vehicle for remotely stopping gas leaks in a gas line is provided. The clamp includes a first boom having a first end, a second end and a pipe engaging portion adjacent the second end. The first boom is provided with a mounting portion adjacent the first end operable to couple the clamp to a mounting structure for manipulating the clamp. The clamp also includes a second boom having a first end, a second end and a pipe engaging portion adjacent the second end. The first and second booms are coupled such that the pipe engaging portions of the first and second booms are positioned to cooperate about a leak portion of a pipe. The clamp has an actuator to selectively engage the first and second pipe engaging portions about the leak portion of the pipe.

32 Claims, 7 Drawing Sheets

CLAMP FOR STOPPING GAS LEAKS

TECHNICAL FIELD OF THE INVENTION

This invention relates generally to the field of pipe repair tools and more particularly, but not by way of limitation, to a clamp for stopping and repairing leaks in natural gas pipes.

BACKGROUND OF THE INVENTION

Leaks occur in, for example, natural gas transportation and distribution lines for a number of reasons. The pipelines may be accidentally ruptured by tooling while laying or repairing adjacent underground works, or corrosion may cause leaks. In any event, leaks in high pressure gas lines, particularly leaks in heavily populated areas, present a significant hazard. In some instances, the gas is shut-off while the pipe is repaired. Often, the technicians must risk repairing the leaks while gas continues to leak from the pipe.

When the leaking lines are underground, technicians must excavate ground to access the leaking area of the pipe. Large excavations may be necessary where the leak is large, located on the underneath or side of the pipe, or where the repair equipment to be employed requires considerable maneuvering room. Also, many techniques employed to repair the leak require that technicians physically descend into the excavations and manually make the pipe repairs. When large volumes of gas are leaking from the pipe, accomplishing such repairs may be difficult and hazardous.

To this end, a need exists for a device to more quickly and safely stop and repair pipelines leaking gas, for example.

SUMMARY OF THE INVENTION

The present invention provides a clamp that may be attached to a vehicle for remotely stopping a leak in a gas line. The clamp includes a first boom having a first end, a second end and a pipe engaging portion adjacent the second end. The first boom is provided with a mounting portion adjacent the first end operable to couple the clamp to a mounting structure, such as a vehicle or repair structure, for manipulating the clamp.

The clamp also includes a second boom having a first end, a second end and a pipe engaging portion adjacent the second end. The first and second booms are coupled such that the pipe engaging portions of the first and second booms are positioned to cooperate about a leak portion of a pipe. The clamp has an actuator operably coupled to at least one of the first and second booms to selectively engage the first and second pipe engaging portions about the leak portion of the pipe.

In another aspect, the clamp includes a first boom with a first end, a second end and a pipe engaging portion adjacent the second end. A first coupling portion is provided between the first and second ends of the first boom. The clamp further includes a second boom with a first end, a second end and a pipe engaging portion adjacent the second end. The first and second booms are coupled such that the pipe engaging portions of the first and second booms are positioned to cooperate about a leak portion of a pipe.

The clamp includes a second coupling portion provided between the first and second ends of the second boom, the second coupling portion of the second boom coupled to the first coupling portion of the first boom. The clamp includes a means for selectively engaging the first and second pipe engaging portions about the leak portion of the pipe. The means is coupled to at least one of the first and second booms between the first ends of the first and second booms and the coupling of the first coupling portion of the first boom to the second coupling portion of the second boom.

In yet another aspect, the clamp is provided with a first shoe coupled to the first boom adjacent the second end of the first boom. The first shoe provided with a surface configured to receive a first portion of a pipe. The clamp also has a second shoe coupled to the second boom adjacent the second end of the second boom. The second shoe provided with a surface configured to receive a second portion of a pipe. In this aspect, the actuator is operably coupled to selectively engage the first and second booms such that the first and second shoes cooperate to reduce gas leaking from the pipe.

In one aspect, the present invention provides a method for repairing a leak in a gas line. The method includes providing the clamp according to one of the above aspects and remotely positioning the clamp adjacent a leak portion of the pipe. The method includes activating the actuator to engage the shoes about the pipe and disconnecting the first and second shoes from the first and second booms, respectively.

The method provides for coupling the first and second shoes to the pipe. In one aspect, the shoes may be sized to extend laterally from the first and second booms to access and weld the first and second shoes to the pipe while the clamp retains the first and second shoes positioned to reduce the leak in the pipe. The method further includes activating the actuator to remove the clamp from the pipe such that the first and second shoes remain coupled to the pipe.

One advantage of the present invention is the ability to remotely stop the leak in the pipe, thus eliminating the necessity for a technician to approach the leaking pipe. Another advantage of the present invention is that the first and second shoes are removably coupled to the first and second booms. Once the clamp is in place and reducing the volume of gas leaking from the pipe, the first and second shoes may be uncoupled from the first and second booms. The first and second shoes are further coupleable to the pipe for a longer-term repair solution. The clamp including the first and second booms may then be removed, leaving the first and second shoes positioned about the leak portion of the pipe.

Another advantage is that the design of the present invention is readily adapted to withstand high pressure leaks and effectively overcome the pressure to clamp such leaks.

Other objects, features, and advantages of the present invention will be apparent to those skilled in the art from the following detailed description when read in conjunction with the accompanying drawings and appended claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
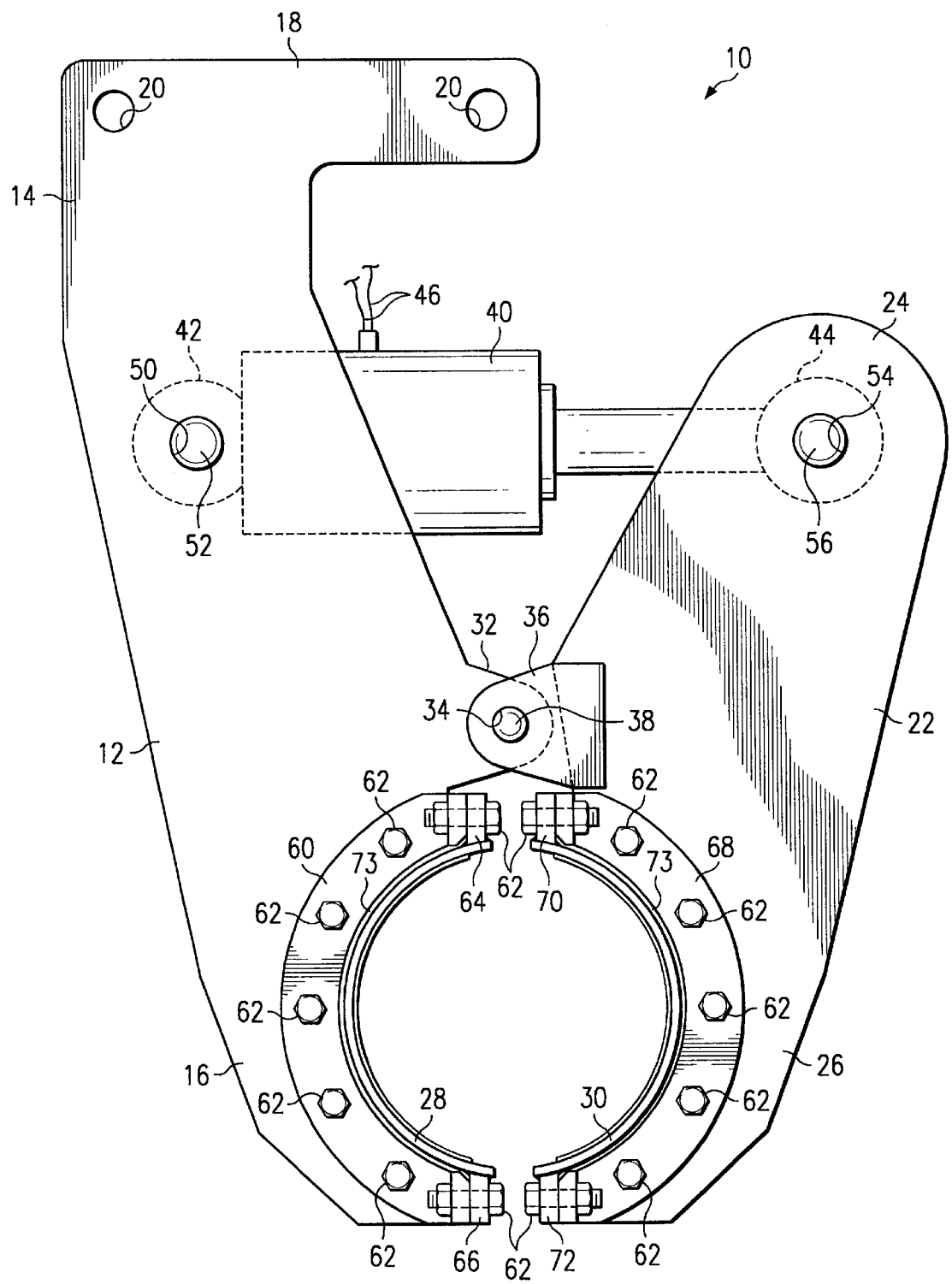
FIG. 1 illustrates a clamp for stopping gas leaks constructed according to one aspect of the present invention.

FIG. 1 illustrates a clamp 10 constructed in accordance with the present invention for stopping and repairing leaks in pipes carrying natural gas. The clamp 10 includes a first boom 12 having a first end 14 and a second end 16. The first end 14 of the first boom 12 may include an arm 18 adapted to mount the clamp 10 to a vehicle (not shown) for remotely employing the clamp 10. The arm 18 may be provided, according to one aspect, with openings 20 to couple the arm 18 to the vehicle, such as in a nut and bolt configuration. However, in other aspects, the clamp 10 may be welded to the vehicle, such as at the arm 18.

The clamp 10 further includes a second boom 22 having a first end 24 and a second end 26. A first shoe 28 is provided on the second end 16 of the first boom 12 and a second shoe 30 is provided on the second end 26 of the second boom 22. The first and second shoes 28 and 30 engage the surface of a pipe (not shown) such that the first and second shoes 28 and 30 are positionable about a leak portion of a pipe to reduce the natural gas, or other fluid, leaking from the pipe. The first and second shoes 28 and 30 are removably coupled to the first and second booms 12 and 22, respectively.

The first boom 12 is provided with a flange 32 defining an opening 34 configured for alignment with a similar opening 34 defined by a flange 36 of a second boom 22. A pin 38 or other coupling may be used for retaining the first boom 12 movably coupled to the second boom 22.

The clamp 10 is provided with an actuator 40, which may be a hydraulic cylinder coupled at a first end 42 to the first boom 12 and at a second end 44 to the second boom 22. Although a 4 inch hydraulic cylinder capable of generating about 25,000 pounds of pressure may be utilized in one aspect, in other aspects, cylinders of various sizes and capabilities or pneumatic cylinders or similar device may be utilized for these purposes and are within the spirit and scope of the present invention. In any event, the actuator 40 may be electronically coupled, via communication lines 46, to the vehicle for remotely operating the actuator and the clamp 10 for these purposes.

A portion 50 of the first boom 12 defines an opening for receiving a pin 52 for coupling the first end 42 of the actuator 40 to the first boom 12. A portion 54 of the second boom 22 defines an opening for receiving a pin 56 for coupling the second end 44 of the actuator 40 to the second boom 22. It will be appreciated that while the pins 38, 52 and 56 illustrate one method of coupling the components of the clamp 10, in other aspects these components may be welded, bolted, or otherwise coupled to one another and are within the spirit and scope of the present invention.

The first and second booms 12 and 22 and the first and second shoes 28 arid 30 may be constructed of a variety of materials such as iron, steel, aluminum or rigid polymeric materials so long as the material selected are sufficiently rigid and structurally sound to support the first and second shoes 28 and 30 to withstand a considerable amount of gas pressure which may, be gas escaping from the pipe. According to one aspect, the shoes 28 and 30 may be constructed as a thin, somewhat flexible, band to more readily conform to the surface of the pipe.

The overall configuration of the clamp 10 is designed such that the first and second shoes 28 and 30 may be retained in a position disposed about the leak portion of the pipe engaged in the manner to reduce the gas escaping from the pipe. The overall configuration of the clamp 10 provides one advantage in that a significant amount of pressure may be transferred from the actuator 40 to the second ends 14 and 24 of the first and second booms 12 and 22, respectively, to compress the first and second shoes 28 and 30 sufficient to reduce significant gas which may be leaking from a pipe.

In one aspect, the clamp 10 may include a first collet 60 coupled adjacent the second end 16 of the first boom 12. The first collet 60 may be permanently coupled, or removably attached with a plurality of couplings 62, such as a nut and bolt configuration. In this aspect, the first shoe 28 is provided with a first flange 64 and a second flange 66 for coupling the first shoe 28 to the first collet 60, such as with couplings 62 or by other means. Similarly, a second collet 68 is coupled to the second end 26 of the second boom 22 in a removable manner such as with the coupling 62 or may be permanently attached, in other aspects. The second shoe 30 is provided with a first flange 70 and a second flange 72 for attaching the second shoe 30 to the second collet 68 such as by utilizing coupling 62.

The configuration of the first and second collets 60 and 68 with respect to the disposition of the first and second shoes 28 and 30 provides for air gaps 73 between the first and second collets 60 and 68 and the first and second shoes 28 and 30. The air gaps 73 provide another advantage of the present invention since the flexible first and second shoes 28 and 30 are able to more readily conform to the surface of the pipe to reduce the leak. Thus, the first and second shoes 28 and 30 are permitted certain expansion and reconfiguration while the clamp 10 is positioned, which could not be accomplished where the first and second shoes 28 and 30 were rigidly positioned in contact with the first and second collets 60 and 68.

Figure 2:
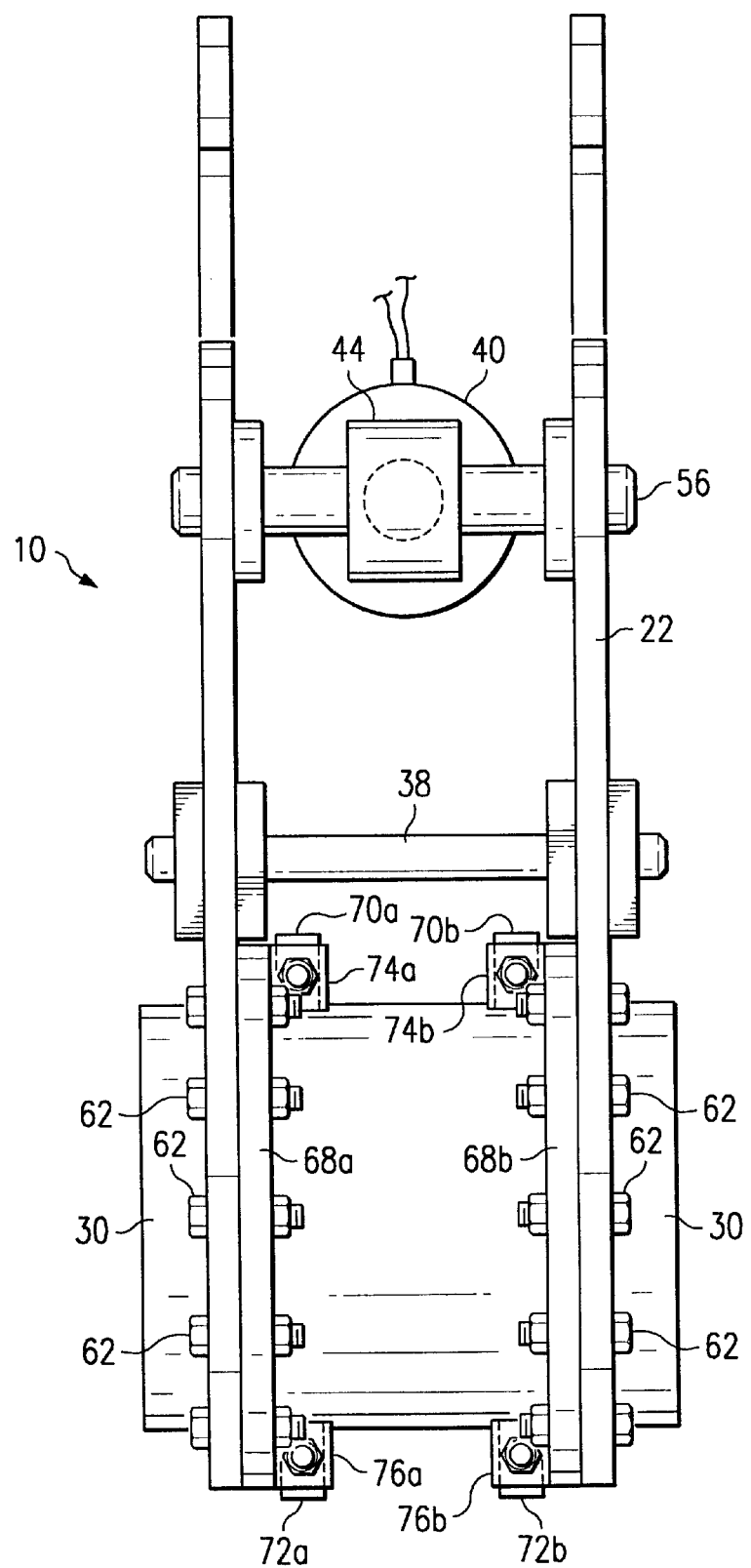
FIG. 2 is a side view of the clamp illustrated in FIG. 1 illustrating the coupling of a shoe to a boom and collet in accordance with the present invention.

Referring also to FIG. 2, a side view of the clamp 10 is shown. Although the second collet 68 may be constructed as a single collar in one aspect, in the present aspect, the second collet 68 may be provided as two substantially identical pieces 68a and 68b. This view illustrates the connection of the second collets 68a and 68b to the second boom 22 utilizing the couplings 62. The second shoe 30 may extend beyond the width of the second collets 68a and 68b, as well as the second boom 22 and sized according to the size of the pipe to be repaired or according to the width of the repair desired based on the damage to the pipe or the leak being repaired.

The second collets 68a and 68b are provided with upper flanges 74a and 74b and lower flanges 76a and 76b for coupling to the second shoe 30. In this manner, the second shoe 30 may be provided with two upper first flanges 70a and 70b and two lower second flanges 72a and 72b. Thus, the first flanges 70a and the second flange 72a of the shoe 30 are coupled, using couplings 62, to the upper flange 74a and lower flange 76a of the second collets 68a, respectively. Similarly, the first flange 70b and second flange 72b of the shoe 30 are coupleable, using couplings 62, to the upper flange 74b and lower flange 76b of the second collet 68b.

It can be seen from the present side view that the configuration of the second boom 22 allows access to the connection of the second collet 68a and 68b to the shoe 30. This configuration allows the second shoe 30 to be connected to the second collet 68 during placement about the leak portion of the pipe, and subsequently disconnected once the second shoe 30 is positioned about the pipe for repairing the leak. The first and second shoes 28 and 30 may then be welded about the pipe. This is another advantage of the present invention in that the first and second shoes 28 and 30 are sized to provided for welding or coupling the first and second shoes 28 and 30 to the pipe while the first and second shoes 23 and 30 remain coupled to the first and second collets 60 and 68.

Although welding may accomplish a sufficient connection of the first and second shoes 28 and 30 to the pipe, in other aspects, one or more band clamps (not shown) may be utilized for fixing the first and second shoes 28 and 30 in position, or band clamps may be utilized to supplement the welded connection. Although welding and band clamps are effective, any number of devices and methods may be utilized for these purposes and are within the spirit and scope of the present invention. The first and second shoes 30 may then be uncoupled from the first and second collets 60 and 68 so that the clamp 10 may be removed.

Figure 3:
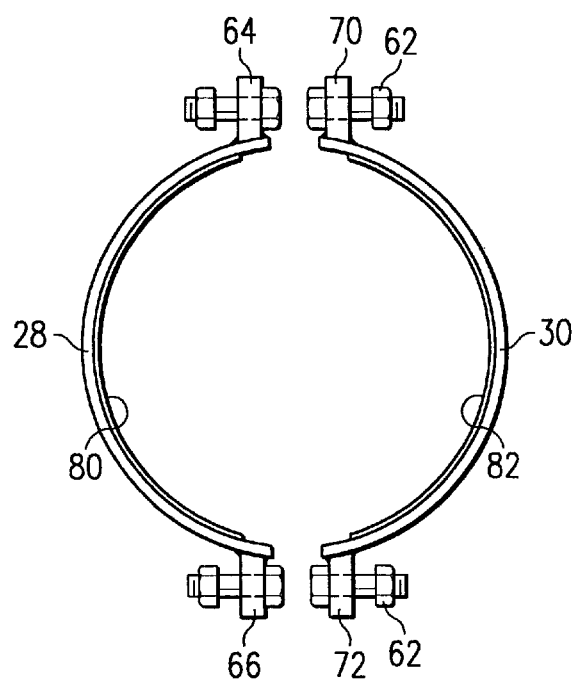
FIG. 3 illustrates the shoes illustrated in FIG. 1 coupleable adjacent a leak portion of a pipe for repairing the leak once the clamp has been removed according to one aspect of the present invention.

FIG. 3 illustrates the first and second shoes 28 and 30 uncoupled from the first and second collets 60 and 68. The configuration of the clamp 10 allows for the first and second booms 12 and 22 and the first and second collets 60 and 68 to be removed leaving the first and second shoes 28 and 30 in place about the leak portion of the pipe for permanent or temporary repair of the pipe.

In one aspect the first and second shoes 28 and 30 may be provided with sealing members 80 and 82, respectively, provided on an inner surface of the first and second shoes 28 and 30. In one aspect the sealing members 80 and 82 may be a gaskets or other sealing devices, while in other aspects the sealing members 80 and 82 may be a rubber layer or coating applied to the first and second shoes 28 and 30. In any event, the sealing members 80 and 82 may be any material provided to promote conforming of the first and second shoes 28 and 30 and the sealing member 80 and 82 to the surface of the pipe for reducing the gas or other fluid leaking from the pipe.

It should be appreciated that while the first and second shoes 28 and 30 are shown as two members, in other aspects the first and second shoes may be constructed as three, four or more separate members for these purposes and are within the spirit and scope of the present invention. Also, the first and second shoes 28 and 30 are shown as substantially arcuate in shape. However, the first and second shoes 28 and 30 may be of any configuration such that the sealing members 80 and 82 are provided to conform to the surface of the pipe. Also while the first and second shoes 28 and 30 are shown connected with the coupling 62, a number of such connecting devices may be selected for connecting the first and second shoes 28 and 30 and are within the spirit and scope of the present invention as disclosed and described herein.

Figure 4:
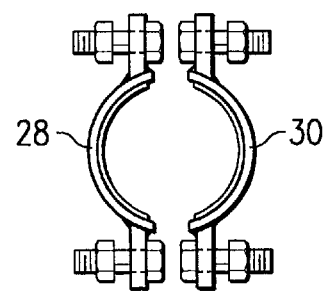
FIG. 4 illustrates smaller shoes sized for repairing pipe having a smaller diameter, according to yet another aspect of the present invention.

FIG. 4 illustrates another aspect of the first and second shoes 28 and 30 sized for a smaller diameter of pipe. One advantage of the present invention is that the clamp 10 is configured to receive a plurality of shoe 28 and 30 of various sizes in other aspect, the first and second shoes 28 and 30 may be coupled to one another to secure the first and second shoes 28 and 30 about the leak portion of the pipe.

Figure 5:
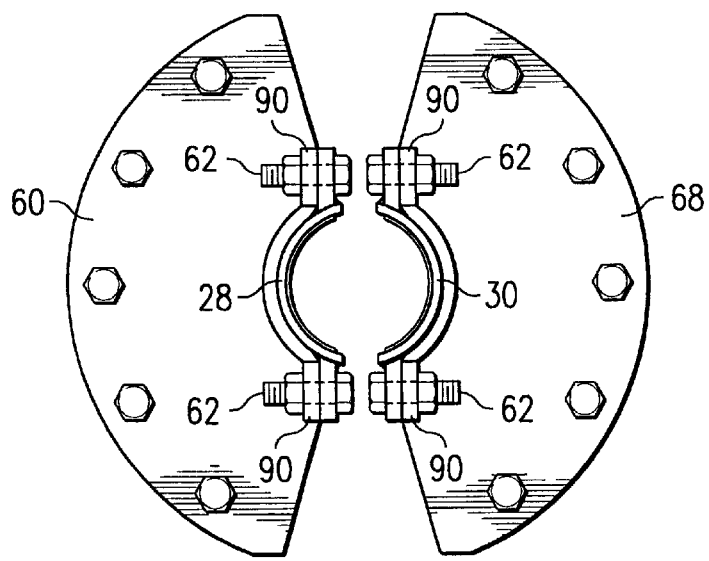
FIG. 5 is a view of another aspect of the collets of the present invention shown coupled to the shoes illustrated in FIG. 4.

Referring also to FIG. 5, the first and second collets 60 and 63 may be provided in various sizes such that the first and second collets 60 and 68 are received by the first and second ends 14 and 26 of the first and second booms 12 and 22. In this aspect, the first and second collets 60 and 68 are sized to receive the first and second shoe 28 and 30 sized to repair pipe having a smaller diameter, such as that illustrated in FIG. 4. In this aspect the first and second shoes 28 and 30 are received at medial portions 90 of the first and second collets 60 and 68. The coupling 62, such as a nut and bolt configuration, may be utilized for the connection of the first and second shoes 28 and 30 too the first and second collets 60 and 68 in this aspect. However, the medial portions 90 of the first and second collets 60 and 68, according to one aspect, may be threaded openings provided in the first and second collets 60 and 68 or other couplings suitable for these purposes.

Figure 6:
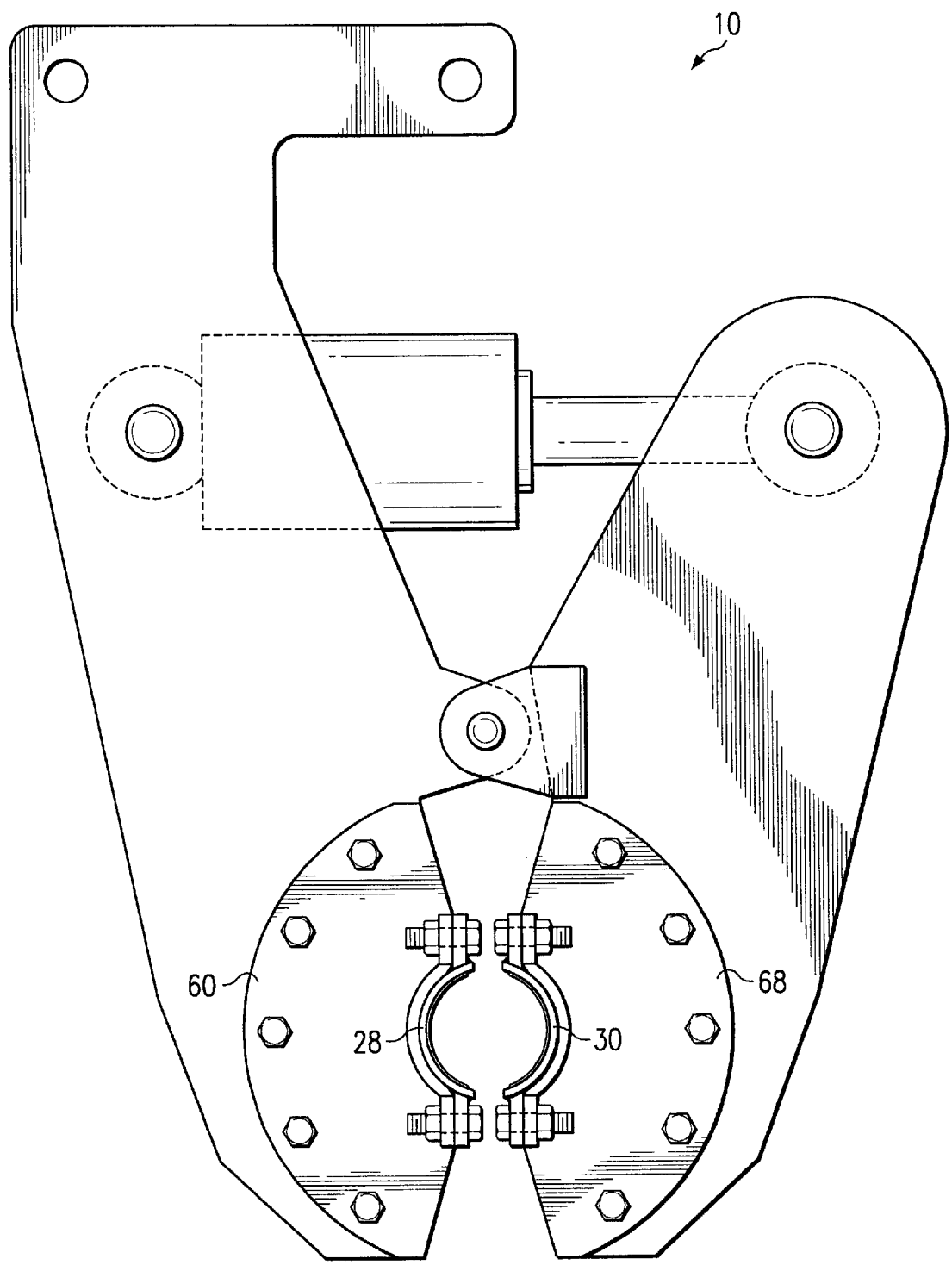
FIG. 6 illustrates the collets and smaller shoes, shown in FIG. 5, coupled to the clamp of the present invention.

FIG. 6 illustrates another aspect of the present invention of the clamp 10 provided with the modified first and second collets 60 and 68, shown in FIG. 5, for receiving the smaller first and second shoes 28 and 30, shown in FIG. 1, sized for repairing a smaller diameter pipe. In one aspect, the clamp 10 of the present invention is provided with a plurality of collets 60 and 68 of various sizes to receive various sizes of shoes 28 and 30, according to the diameter of the pipe to be repaired.

In this manner, the clamp 10 of the present aspect is advantageously provided such that technicians may arrive at the scene of a leaking pipe and, upon determining the size of the pipe to be repaired, may quickly retrieve the appropriate size collets 60 and 68 and shoes 28 and 30 to adapt the clamp 10 of the present invention for such repair without the need for a multiple clamps 10 each sized for a different diameter pipe. In other aspects, however, the clamp 10 may be utilized such that multiple clamps 10 each adapted for a different diameter pipe may also be utilized equally well.

Figure 7:
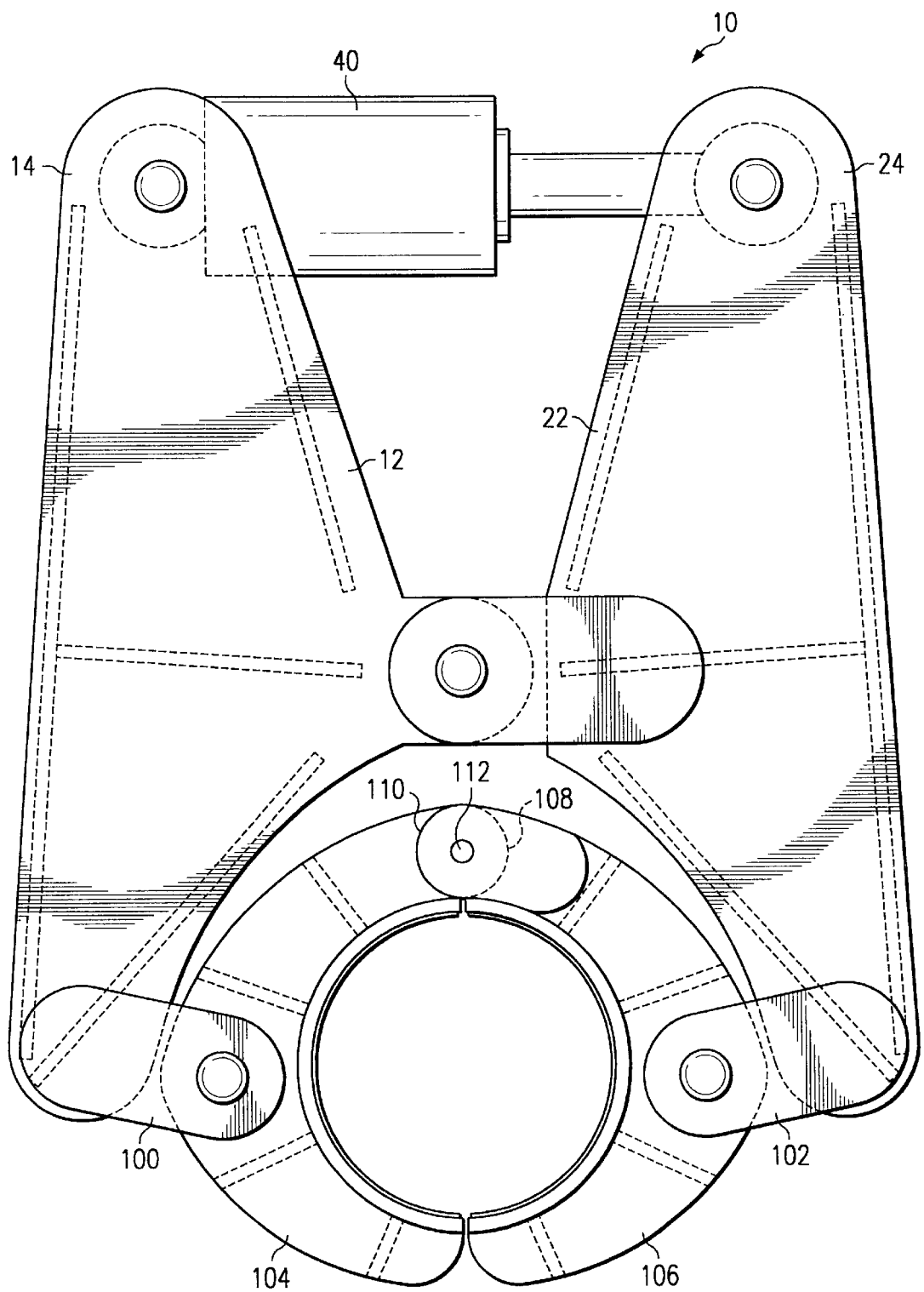
FIG. 7 illustrates the clamp constructed in accordance with another aspect of the present invention for stopping gas leaks.

FIG. 7 illustrates another aspect of the present invention of the clamp 10 for repairing leaks in gas pipelines. In this aspect, the first and second booms 12 and 22 are provided with extension members 100 and 102, respectively. The extension members 100 and 102 are coupled to first and second collars 104 and 106, respectively. The first and second collars 104 and 106 are adapted to be positioned about the leak portion of pipe for stopping and repairing the leak. In this aspect the first and second collars 104 and 106 may be provided with flanges 108 and 110 defining openings alienable for receiving a pin for hingingly connecting the first and second collars 104 and 106 to one another.

One advantage of the present aspect of the clamp 10 is that the extension members 100 and 102 provide for optimizing the opening of the first and second collars 104 and 106 when the first ends 14 and 24 of the first and second booms are brought together by the actuator 40 for positioning the clamp 10 about the leak portion of the pipe.

Figure 8:
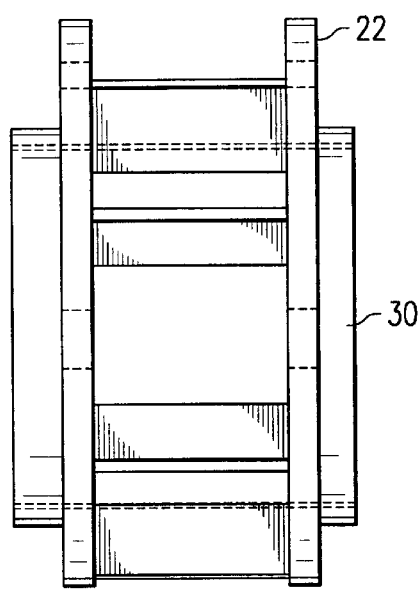
FIG. 8 is a side view of the clamp illustrated in FIG. 7 with collars for positioning the shoes for repairing gas leaks.

FIG. 8 illustrates a side view of the clamp 10 illustrated in FIG. 7. In this aspect, the second shoe 30 is similarly positionable by the second boom 22 adjacent the leak portion of the pipe. Once in position, the first and second shoes 28 and 30 may be welded our otherwise coupled to the pipe while the first and second booms 12 and 22 retain the first and second shoes 28 and 30 in place about the leak portion of the pipe. In other aspects, the first and second shoes 28 and 30, or the entire clamp 10, may be provided only as a temporary repair retained in place until a convenient time to shut-off the gas in the pipeline or until a bypass or other more permanent repair to the pipeline can be accomplished.

Figure 9:
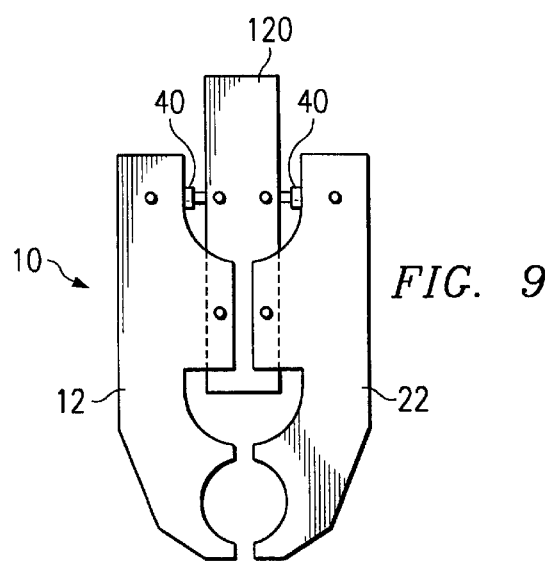
FIG. 9 illustrates the clamp constructed in accordance with yet another aspect of the present invention for stopping gas leaks.

FIG. 9 illustrates another aspect of the clamp 10 of the present invention shown with a member 120 adapted to hingingly receive the first and second booms 12 and 22. In this aspect, the clamp 10 may be provided with multiple actuators 40 for operating the clamp 10. In one aspect (not shown), the second boom 22 may be rigidly fixed to the member 120 and only a single actuator 40 coupled to the first boom 12 may be employed. The member 120 is adapted to be received by a mechanical arm or other structure for manipulating the clamp 10 for positioning about the leak portion of the pipe.

Figure 10:
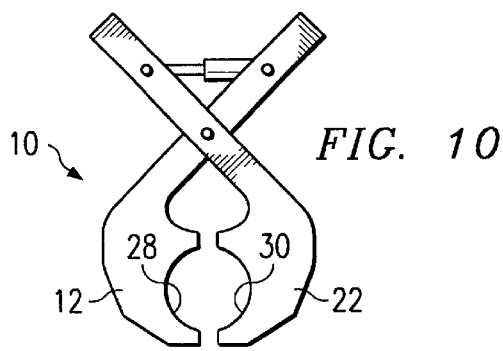
FIG. 10 illustrates the clamp constructed according to another aspect of the present invention for stopping gas leaks.

FIG. 10 illustrates another aspect of the clamp 10 for stopping or reducing gas leaking from a pipe. In this aspect the first and second booms 12 and 22 are provided in a wrench configuration to promote the clamping of the first and second shoes 28 and 30 about the leak portion of the pipe.

Figure 11:
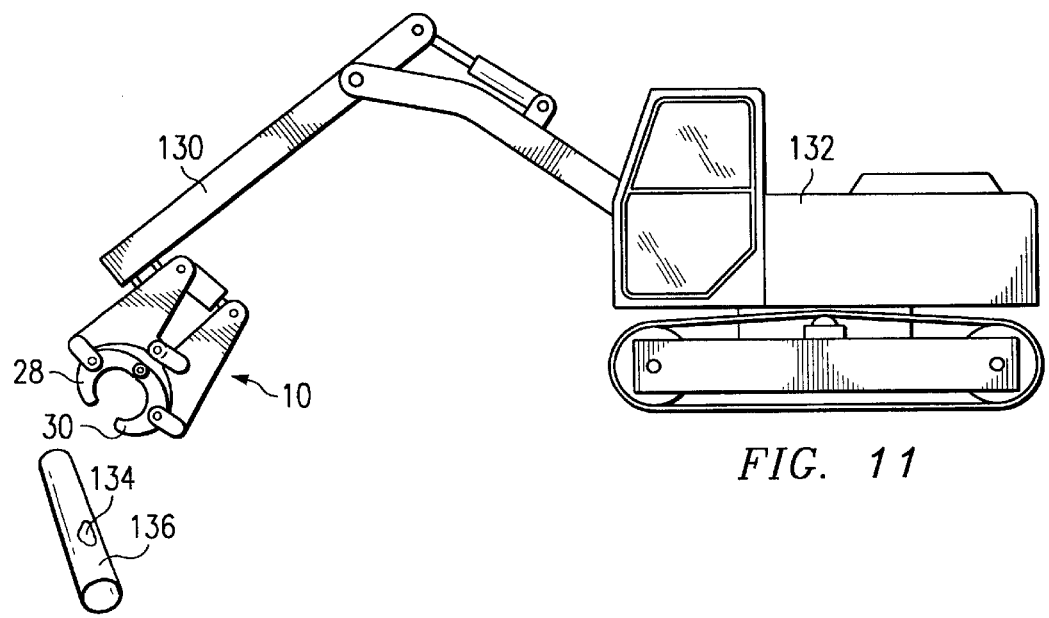
FIG. 11 is a perspective view of the clamp, according to one aspect, coupled to a vehicle for remotely utilizing the clamp for sealing gas leaks in pipe.

FIG. 11 illustrates the clamp 10 coupled to a mechanical arm 130 of a vehicle 132 such as a backhoe. In this manner, an operator may remotely operate the clamp 10 from the vehicle 132 and position the clamp 10 about the leak portion 134 of a pipe 136. This provides another advantage of the present invention since ordinarily a repair technician places must be in a close proximity to the pipe 136 to repair the pipe 136. The clamp 10 of the present invention coupled to the vehicle 132 allows the user of the present invention to remotely place the clamp 10 about the leak portion 134 of the pipe 136 from a safe distance. Once the clamp 10 is in position about the leak portion 134 and reducing the gas leaking from the pipe 136, the technicians may then weld or otherwise couple the first and second shoes 28 and 30 to the pipe and make any permanent or temporary repairs, such as welding the first and second shoes 28 and 30 to the pipe 136.

Although the present invention may be configured for pipe 136 of any size, the present invention is well suited for pipe ranging in size from 2–36 inches in diameter. Also, the present invention is well suited for stopping and repairing leaks in pipe carrying fluid or gas under up to 800 pounds of pressure.

Figure 12:
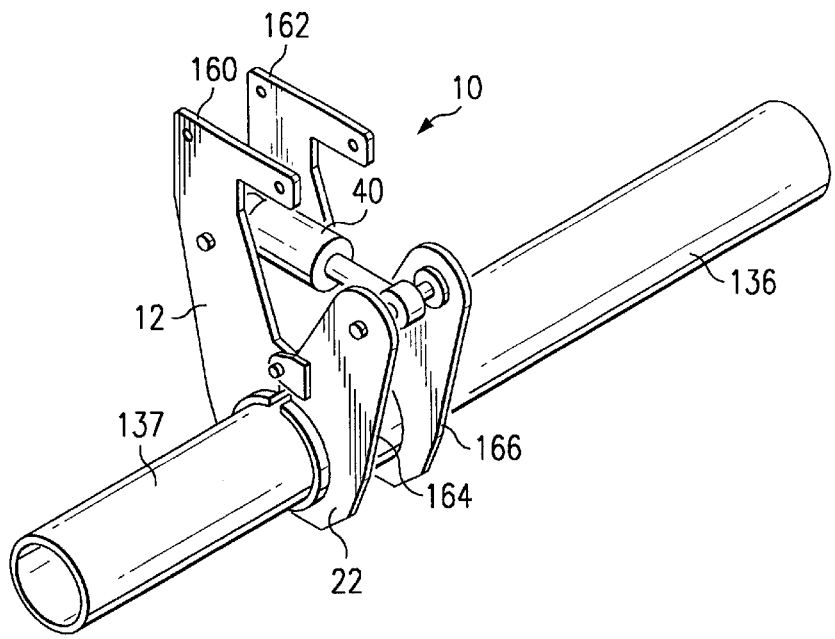
FIG. 12 is a perspective view of another aspect of the clamp of the present invention shown positioned about the pipe.

FIG. 12 is a perspective view illustrating the clamp 10, according to one aspect, coupled about the pipe 136 for stopping or reducing fluids or gas from leaking from the pipe 136. The clamp 10 is shown removed from the vehicle 132 with the actuator 40 activated to engage the first and second booms 12 and 22 and the first and second shoes 28 and 30 about a surface 137 of the pipe 136. In this aspect, the first and second booms 12 and 22 are illustrated such that the first boom 12 includes a first portion 160 coupled to a second portion 162 and such that the second boom 22 includes a first portion 164 and a second portion 166.

Figure 13:
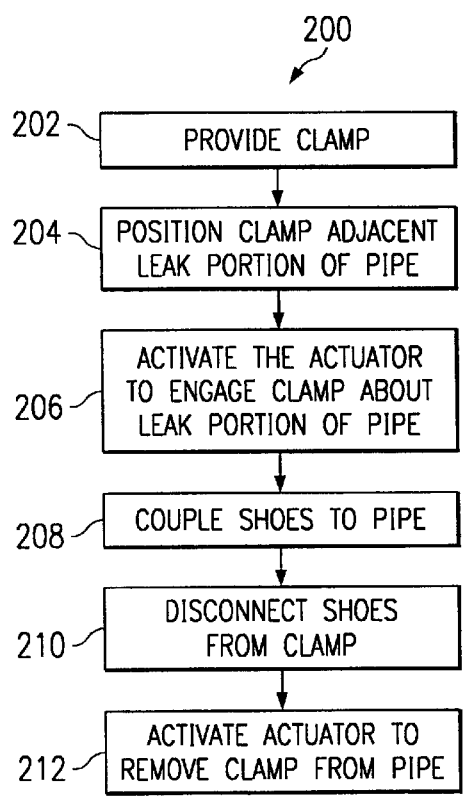
FIG. 13 is a flow-chart of a method for stopping and repairing gas leaks, according to another aspect of the present invention.

FIG. 13 illustrates a method 200 according to one aspect of the present invention for repairing the leak 134 portion of the pipe 136. At a block 202, the method includes providing the clamp 10 as described and disclosed above. At a block 204, the method includes positioning the clamp 10 adjacent the leak portion 134 of the pipe 136. As previously discussed, one advantage of the present invention is the ability to remotely replace and manipulate the clamp 10 remotely by coupling the clamp 10 to the vehicle 132 or other fixed structure or equipment utilized for these purposes.

At a block 206, the method provides for activating the actuator to engage the clamp 10 about the leak portion 134 of the pipe 136. At the block 206, the user of the present invention may actuate the actuator 40 remotely where the communication lines 46 are coupled to the actuator 40 and extend to, for example, the vehicle 132. At a block 208, the method includes coupling the first and second shoes 28 and 30 to the pipe, such as by welding.

At a block 210, the method includes disconnecting the shoes 28 and 30, such as the first and second shoes 28 and 30, from the first, and second booms 12 and 22, respectively. The method provides, at a block 212, for activating the actuator to remove the clamp 10 from the pipe 136. Thereafter, the repair technicians may weld or otherwise make a permanent repair to the pipe 136, or in some aspects, may maintain the clamp 10 engaged about the leak portion 134 of the pipe 136 until such time as a permanent repair, such as a bypass, can be made.

Thus, it is apparent that there has been provided, in accordance with the present invention, a clamp for stopping and repairing gas leaks that satisfies one or more of the advantages set forth above. Although the preferred embodiment has been described in detail, it should be understood that various changes, substitutions, and alterations can be made herein without departing from the scope of the present invention, even if all of the advantages identified above are not present. For example, the various elements or components may be combined or integrated in another system or certain features may not be implemented.

Also, the techniques, systems, sub-systems, and methods described and illustrated in the preferred embodiment as discrete or separate may be combined or integrated with other systems, modules, techniques, or methods without departing from the scope of the present invention. Other items shown as directly coupled to each other may be coupled through some other interface or device, such that the items may no longer be considered directly coupled to each other but may still be in communication with one another. Other examples of changes, substitutions, and alterations are readily ascertainable by one skilled in the art and could be made without departing from the spirit and scope of the present invention.

What is claimed is:

1. A clamp for stopping a leak in a gas line, the clamp comprising:
   a first boom having a first end, a second end, a pipe engaging portion adjacent the second end and a mounting portion adjacent the first end operable to couple the clamp to a mounting structure for manipulating the clamp;

a second boom having a first end, a second end, and a pipe engaging portion adjacent the second end, the first and second booms coupled such that the pipe engaging portions of the first and second booms are positioned to cooperate about a leak portion of a pipe; and an actuator operably coupled to at least one of the first and second booms to selectively engage the first and second pipe engaging portions about the leak portion of the pipe, wherein the clamp further includes a vehicle operable for manipulating the clamp and wherein the mounting portion of the first boom is coupled to a portion of the vehicle, and wherein the clamp further includes a controller remotely located from the clamp and operably coupled to control the actuator to manipulate the clamp, wherein the vehicle is a backhoe and the mounting portion of the first boom is operable to couple the clamp to a portion of the backhoe, wherein the controller is located to manipulate the clamp from the backhoe.

2. A clamp for stopping a leak in a gas line, the clamp comprising:

a first boom having a first end, a second end, a pipe engaging portion adjacent the second end and a mounting portion adjacent the first end operable to couple the clamp to a mounting structure for manipulating the clamp;

a second boom having a first end, a second end, and a pipe engaging portion adjacent the second end, the first and second booms coupled such that the pipe engaging portions of the first and second booms are positioned to cooperate about a leak portion of a pipe; and an actuator operably coupled to at least one of the first and second booms to selectively engage the first and second pipe engaging portions about the leak portion of the pipe, wherein the mounting portion of the first boom is welded to the mounting structure.

3. A clamp for stopping a leak in a gas line, the clamp comprising:

a first boom having a first end, a second end, a pipe engaging portion adjacent the second end and a mounting portion adjacent the first end operable to couple the clamp to a mounting structure for manipulating the clamp;

a second boom having a first end, a second end, and a pipe engaging portion adjacent the second end, the first and second booms coupled such that the pipe engaging portions of the first and second booms are positioned to cooperate about a leak portion of a pipe; and an actuator operably coupled to at least one of the first and second booms to selectively engage the first and second pipe engaging portions about the leak portion of the pipe, wherein the mounting portion of the first boom is removably coupled to the mounting structure.

4. A clamp for stopping a leak in a gas line, the clamp comprising:

a first boom having a first end, a second end and a pipe engaging portion adjacent the second end;

a first coupling portion provided between the first and second ends of the first boom;

a second boom having a first end, a second end and a pipe engaging portion adjacent the second end, the first and second booms coupled such that the pipe engaging portions of the first and second booms are positioned to cooperate about a leak portion of a pipe;

a second coupling portion provided between the first and second ends of the second boom, the second coupling portion of the second boom coupled to the first coupling portion of the first boom; and a means for selectively engaging the first and second pipe engaging portions about the leak portion of the pipe, the means coupled to at least one of the first and second booms between the first ends of the first and second booms and the coupling of the first coupling portion of the first boom to the second coupling portion of the second boom.

5. The clamp of claim 4, wherein the means for selectively engaging the first and second pipe engaging portions about the leak portion of the pipe is further defined as an actuator coupled to the first boom between the first coupling portion of the first boom and the first end of the first boom.

6. The clamp of claim 5, wherein the actuator is further defined as having a first end and a second end, and the first end of the actuator is coupled to the first boom between the first coupling portion of the first boom and the first end of the first boom and second end of the actuator coupled to the second boom between the second coupling portion of the second boom and the first end of the second boom.

7. The clamp of claim 4, wherein the means is further defined as an actuator coupled to the second boom between the second coupling portion of the second boom and the first end of the second boom.

8. The clamp of claim 4, wherein the means for selectively engaging the first and second pipe engaging portions about the leak portion of the pipe is further defined as a hydraulic cylinder.

9. The clamp of claim 4, wherein the means for selectively engaging the first and second pipe engaging portions about the leak portion of the pipe is further defined as a pneumatic cylinder.

10. The clamp of claim 4, wherein first and second coupling portions of the first and second booms are further defined as pivotally coupled to one another.

11. A clamp for stopping a leak in a gas line, the clamp comprising:

a first boom having a first end and a second end;

a first shoe coupled to the first boom adjacent the second end of the first boom, the first shoe provided with a surface configured to receive a first portion of a pipe;

a second boom having a first end and a second end;

a second shoe coupled to the second boom adjacent the second end of the second boom, the second shoe provided with a surface configured to receive a second portion of a pipe; and an actuator operably coupled to selectively engage the first and second booms such that the first and second shoes cooperate to reduce gas leaking from the pipe, wherein the first and second shoes are further provided with coupling portions to removably couple the first and second shoes to the first and second booms, respectively.

12. The clamp of claim 11, wherein the coupling portions of the first and second shoes are positioned such that when the first and second booms engage the first and second shoes about the pipe, the coupling portions are aligned so that the coupling portions of the first and second shoes are connectable to one another.

13. A clamp for stopping a leak in a gas line, the clamp comprising:

a first boom having a first end and a second end;

a first shoe coupled to the first boom adjacent the second end of the first boom, the first shoe provided with a surface configured to receive a first portion of a pipe;

a second boom having a first end and a second end;

a second shoe coupled to the second boom adjacent the second end of the second boom, the second shoe provided with a surface configured to receive a second portion of a pipe; and an actuator operably coupled to selectively engage the first and second booms such that the first and second shoes cooperate to reduce gas leaking from the pipe, wherein the first shoe further comprises a first and second coupling portion coupled to the first boom and wherein the second shoe further comprises a first and second coupling portion coupled to the second boom, the first and second coupling portions of the first and second shoes positioned such that the first coupling portions of the first and second shoes and the second coupling portions of the first and second shoes are coupleable to one another to retain the first and second shoes about the pipe.

14. A clamp for stopping a leak in a gas line, the clamp comprising:

a first boom having a first end and a second end;

a first shoe coupled to the first boom adjacent the second end of the first boom, the first shoe provided with a surface configured to receive a first portion of a pipe;

a second boom having a first end and a second end;

a second shoe coupled to the second boom adjacent the second end of the second boom, the second shoe provided with a surface configured to receive a second portion of a pipe; and an actuator operably coupled to selectively engage the first and second booms such that the first and second shoes cooperate to reduce gas leaking from the pipe, wherein the first and second shoes are both provided with a first and second coupling portions removably coupled to the first and second booms, respectively.

15. A clamp for stopping a leak in a gas line, the clamp comprising:

a first boom having a first end and a second end;

a first shoe coupled to the first boom adjacent the second end of the first boom, the first shoe provided with a surface configured to receive a first portion of a pipe;

a second boom having a first end and a second end;

a second shoe coupled to the second boom adjacent the second end of the second boom, the second shoe provided with, a surface configured to receive a second portion of a pipe; and an actuator operably coupled to selectively engage the first and second booms such that the first and second shoes cooperate to reduce gas leaking from the pipe, wherein the clamp further includes:

a first collet coupled adjacent the second end of the first boom, the first collet configured to receive the first shoe;

a first sealing member provided on the surface of the first shoe to promote the sealing engagement of the first shoe with the pipe;

a second collet coupled adjacent the second end of the second boom, the second collet configured to receive the second shoe; and a second sealing member provided on the surface of the second shoe to promote sealing engagement of the second shoe with the pipe.

16. The clamp of claim 15, wherein the first and second shoes are further defined as substantially arcuate flanges each having a first end, a second end, a first coupling portion provided on the first end and a second coupling portion provided on the second end, the first and second coupling portions coupled to the first and second collets.

17. The clamp of claim 15, wherein the first and second shoes are removably coupled to the first and second collets.

18. The clamp of claim 15, wherein the first sealing member is further defined as a gasket.

19. The clamp of claim 15, wherein the first sealing member is constructed of a polymeric material.

20. The clamp of claim 15, wherein the first sealing member is a constructed of rubber.

21. The clamp of claim 15, wherein the first collet is provided with a substantially arcuate surface and wherein the first shoe is provided with a substantially arcuate surface such that an air gap is defined between the substantially arcuate surfaces of the first shoe and the first collet when the first shoe is coupled to the first collet.

22. The clamp of claim 21, wherein the second collet is provided with a substantially arcuate surface and wherein the second shoe is provided with a substantially arcuate surface such that an air gap is defined between the substantially arcuate surfaces of the second shoe and the second collet when the second shoe is coupled to the second collet.

23. The clamp of claim 22, wherein the first and second shoes are further defined as flexibly configured to conform to the pipe.

24. The clamp of claim 23, wherein the first and second shoes are constructed of a rigid material suitable for welding the first and second shoes to the pipe.

25. A method for repairing a leak in a gas line, the method comprising:

providing a clamp including:
- a first boom having a first end and a second end,
- a first shoe coupled to the first boom adjacent the second end of the first boom, the first shoe provided with a surface configured to receive a first portion of a pipe,
- a second boom having a first end and a second end,
- a second shoe coupled to the second boom adjacent the second end of the second boom, the second shoe provided with a surface configured to receive a second portion of a pipe, and
- an actuator operably coupled to selectively engage the first and second booms such that the first and second shoes cooperate to reduce gas leaking from the pipe; and positioning the clamp adjacent a leak portion of the pipe;

activating the actuator to engage the shoes about the pipe;

connecting the first and second shoes to the pipe;

disconnecting the first and second shoes from the first and second booms, respectively; and activating the actuator to remove the clamp from the pipe such that the first and second shoes remain coupled to one another about the pipe.

26. The method of claim 26, further comprising coupling the clamp to a vehicle.

27. The method of claim 26, wherein the vehicle is a backhoe and wherein the first boom is further provided with an arm coupled to the backhoe.

28. The method of claim 26, wherein the method further includes:

operating the vehicle to remotely place the clamp adjacent the pipe remotely activating the actuator from the vehicle; and remotely activating the actuator from the vehicle to remove the clamp.

29. The method of claim 25, wherein the first and second shoes are welded to the pipe.

30. The method of claim 25, wherein the first and second shoes are coupled to the pipe by a band strap.

31. The method of claim 30, wherein the first and second shoes are further welded to the pipe.

32. The method of claim 26, wherein the first and second shoes are coupled to one another to secure the first and second shoes to the pipe.

* * * * *